United States Patent [19]

Birdwell et al.

[11] 4,292,592
[45] Sep. 29, 1981

[54] PULSED POWER SUPPLY SYSTEM

[75] Inventors: James A. Birdwell; Joseph M. Delasko, both of Houston, Tex.

[73] Assignee: Dresser Industries, Inc., Dallas, Tex.

[21] Appl. No.: 43,866

[22] Filed: May 29, 1979

[51] Int. Cl.³ .................... H05H 5/00; G21G 4/02
[52] U.S. Cl. ............................. 328/233; 250/502; 307/261
[58] Field of Search ............ 307/261, 264, 253, 260; 250/501, 502; 363/59, 60, 61; 328/227, 233

[56] References Cited

U.S. PATENT DOCUMENTS

| | | | |
|---|---|---|---|
| 3,714,468 | 1/1973 | Hopkinson | 307/252 J |
| 3,986,085 | 10/1976 | Weber | 363/61 X |
| 4,010,535 | 3/1977 | Hishiki et al. | 363/61 X |
| 4,092,545 | 5/1978 | Langford et al. | 250/502 X |

*Primary Examiner*—John Zazworsky
*Attorney, Agent, or Firm*—Richard M. Byron; Patrick H. McCollum

[57] ABSTRACT

A square wave clock signal is coupled to a transistor, the output of which is transformer coupled to the base of a driver transistor. The conducting of the driver transistor will cause an increase in the current through the primary of a flyback transformer, thereby resulting in a relatively small negative going voltage potential being induced therein. When the driver transistor is caused to go into a non-conducting state, due to the signal on the base, the decrease in current through the primary of the flyback transformer in relation to the change in time is large, thereby inducing a large positive voltage potential across the primary. The induced voltage is stepped-up by the flyback transformer where the negative overring portion is rectified and regulated to supply a potential to the grid of an ion source. The positive voltage pulse is coupled into a voltage multiplier circuit, the output of which is connected between the ion source anode and cathode of an accelerator tube used for producing fast neutrons from the D-T reaction. Additionally, a firing reference signal is coupled from the driver transistor to the radioactivity logging instrument to provide a timing signal used to enable the detecting circuitry therein for measuring radiations returning from the formations as a result of fast neutrons being emitted by the ion source.

4 Claims, 3 Drawing Figures

PULSED POWER SUPPLY SYSTEM

BACKGROUND OF THE INVENTION

This invention relates generally to a circuit for producing high voltage pulses and more specifically to an apparatus for producing high voltage pulses from a voltage multiplier circuit driven by a tuned flyback transformer circuit.

It is well known that oil and gas are more likely to be discovered in commercial quantities from formations of a relatively porous nature than from those formations which are less permeable. It is also well known in the industry that oil or gas producing formations may be located by passing a pulsed neutron source through a borehole and measuring secondary gamma ray radiation developed from the neutron irradiation of the formations surrounding the borehole. One such method of neutron-gamma ray logging is referred to as carbon-oxygen logging.

In carbon-oxygen logging of this type, a pulsed neutron source is pulsed at a very high repetition rate and the inelastic gamma ray energy spectrum, resulting from the formation bombardment by fast neutrons, is analyzed. In the past there has been available two pulsed power supply systems for providing the extremely high potentials required to cause the D-T reaction used to generate these fast neutrons. One such power method uses a belt-type electrostatic generator, such as a Van de Graaff generator, while the second power supply system utilizes a SCR pulsing circuit combined with a voltage multiplying circuit to produce the potentials desired.

In a belt-type electrostatic generator, as a Van de Graaff generator, an electrically insulated belt is driven by a pair of spaced pulleys. Electrical charges of one polarity are applied to the belt adjacent one pulley. Adjacent the other pulley, the charges are removed from the belt at a point within a high voltage terminal where they are accumulated to develop and maintain the required high voltage. Many problems have been encountered with such generators, particularly as used within subsurface instruments, such as those employed in nuclear well logging. Electromechanical generators of the Van de Graaff type suffer from excessive motor noise and sparking which can affect the output of the ion source. Further, these generators do not provide a constant output and are limited in the physical and thermal abuses to which they can withstand. These difficulties have severely limited the efficient use of such generators in well logging.

As stated above a second pulsed power supply system used in radioactivity logging utilizes a SCR pulsing circuit to feed a voltage multiplier string. In this system, as described in U.S. Pat. No. 3,714,468, issued Jan. 30, 1973 to E. C. Hopkinson, and assigned to the assignee of the present application, a unijunction oscillator triggers a SCR thereby producing a voltage pulse. The voltage pulse is transformer coupled to a voltage multiplier circuit which is connected to the ion source. While a supply of this type functions well at relative low frequencies, as example 1KH it will not operate at the higher pulse rated required for spectrum analysis using the so-called carbon logging instrument. Further, this power supply system requires an additional negative voltage source for providing the negative potential need on the grid of the ion source.

Accordingly, the present invention overcomes the deficiencies of the prior art by providing circuitry for generating high voltage pulses at high repetition rates to be used in powering an ion source, and further providing the negative grid voltage potential from the same supply and a tracking signal for synchronizing the detector circuitry of the radioactivity instrument.

SUMMARY OF THE INVENTION

A clocking square wave is coupled to the base of a transistor for shaping. The resulting output signal is transformer coupled to the base of a second transistor. As the second transistor conducts, current will flow through the primary of a flyback transformer. This rising current flow results in a negative going voltage potential being induced in the primary of the flyback transformer. During flyback there is a fast drop in current flow through the primary. This fast drop in current induces a high positive voltage pulse.

The voltages induced in the primary of the flyback transformer are stepped-up in potential by the transformer. The negative overring portion of the secondary signal is rectified, regulated and placed on the grid of the accelerator tube. The positive voltage pulse is coupled into a voltage multiplier circuit, the output of which is connected between the anode of the ion source and the cathode of the ion source and will result in fast neutrons being produced at high repetition rates from the D-T reaction. Further, a signal is removed from the collector of the flyback driver transistor which is used to control the gating of the detector circuitry within the radioactivity logging instrument. This timing signal assures the proper sequencing of the detectors should the flyback time or firing point of the ion source be altered by temperature affects.

Accordingly, it is a feature of the present invention to provide a new and improved circuit for producing high voltage pulses;

It is still another feature of the invention to provide a new and improved high voltage source for use with an acceleration tube;

It is yet another feature of the invention to provide a new and improved high voltage pulse source for use in producing high energy neutrons;

It is still another feature of the invention to provide a new and improved high voltage pulse source for use at high repetition rates to produce fast neutrons.

BRIEF DESCRIPTION OF THE DRAWINGS

FIG. 3 is an illustration of waveforms associated with the circuitry of FIG. 2.

DETAILED DESCRIPTION OF THE PREFERRED EMBODIMENT

Figure 1:
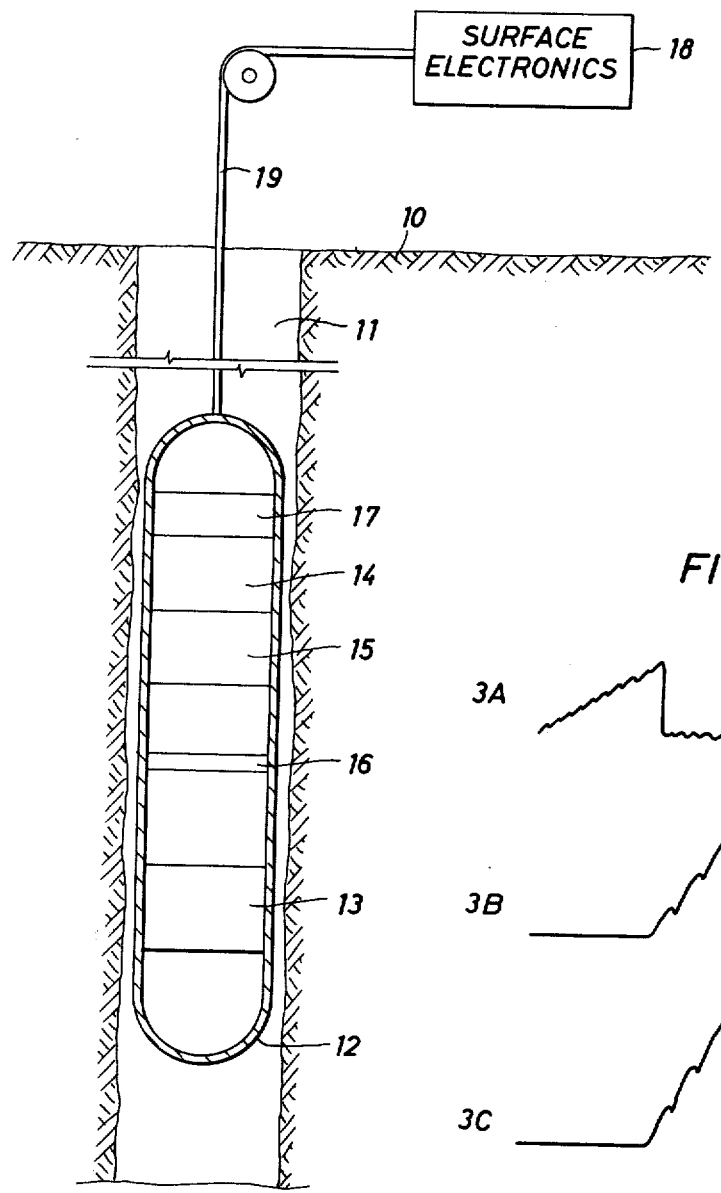
FIG. 1 is an overall schematic diagram of the well logging system of the present invention.

Referring now to the drawings in more detail, especially to FIG. 1, there is illustrated schematically a radioactivity well logging operation in which a portion of the earth 10 is shown in vertical section. A well 11 penetrates the earth's surface and may or may not be cased. Disposed within the well 11 is subsurface instrument 12 of the well logging system.

Subsurface instrument 12 contains a source or accelerator 13 for producing high energy neutrons. The neutron source 13 contemplated for use herein is a pulsed neutron source operating from the principle of the deuterium-tritium reaction. Such a pulsed neutron source is commonly referred to as an "artifical" source of radiation because it may be turned off when not in use and because it provides relatively monoenergetic radiation of a particular character. Typical of these artifical sources is the static atmosphere ion accelerator tube described in U.S. Pat. No. 2,687,918 to A. H. Youmans and U.S. Pat. No. 3,309,522 also to A. H. Youmans.

Again referring to FIG. 1, a suitable radiation detector comprising photo multiplier tube 14 and detector crystal 15 is provided for detecting gamma rays resulting from the inelastic scattering of high energy neutrons by the earth formations surrounding the well borehole 11. A radiation shield 16 is interposed between neutron source 13 and detector crystal 15. This neutron absorbing shield 16 may be, for example, constructed of tungsten, copper or a hydrogeneous material such as paraffin or a combination of such materials. Radiation shield 16 reduces the probability of direct irradiation of detector crystal 15 by neutrons emitted by pulsed neutron source 13.

In making a radioactivity log of a well, instrument 12 is caused to traverse well 11. Thereby, high energy neutrons from source 13 irradiate the formations surrounding the borehole and radiations influenced by the formations are detected by detector crystal 15. In making the inelastic scattering measurements contemplated by the present invention neutron pulses of approximately ten microseconds duration are used, and it is desirable to repeat the pulses at relatively high repetition rates of 20,000 times per second or greater.

As is well known in the art, scintillation crystal 15 produces a discrete flash of light whenever a gamma ray passes therethrough and exchanges energy with the crystal lattice structure. Photomultiplier tube 14 generates a voltage pulse proportional in height to the intensity of each such scintillation which occurs within crystal 15. The intensity of such scintillations is functionally related to the energy of the gamma ray causing the light flash and thus a voltage pulse generated by photomultiplier 14 has an amplitude functionally related to the energy of the corresponding gamma ray. The proportional voltage pulses produced by photomultiplier tube 14 are coupled to subsurface electronics 17 for processing and transmittal by logging cable 19 to surface electronics 18 where the signal is subjected to spectral analysis to determine physical characteristics of the irradiated formations. A more detailed description of such operation can be had by reference to U.S. Pat. No. 3,780,303, issued Dec. 18, 1973 to H. D. Smith, et al.

Figure 2:
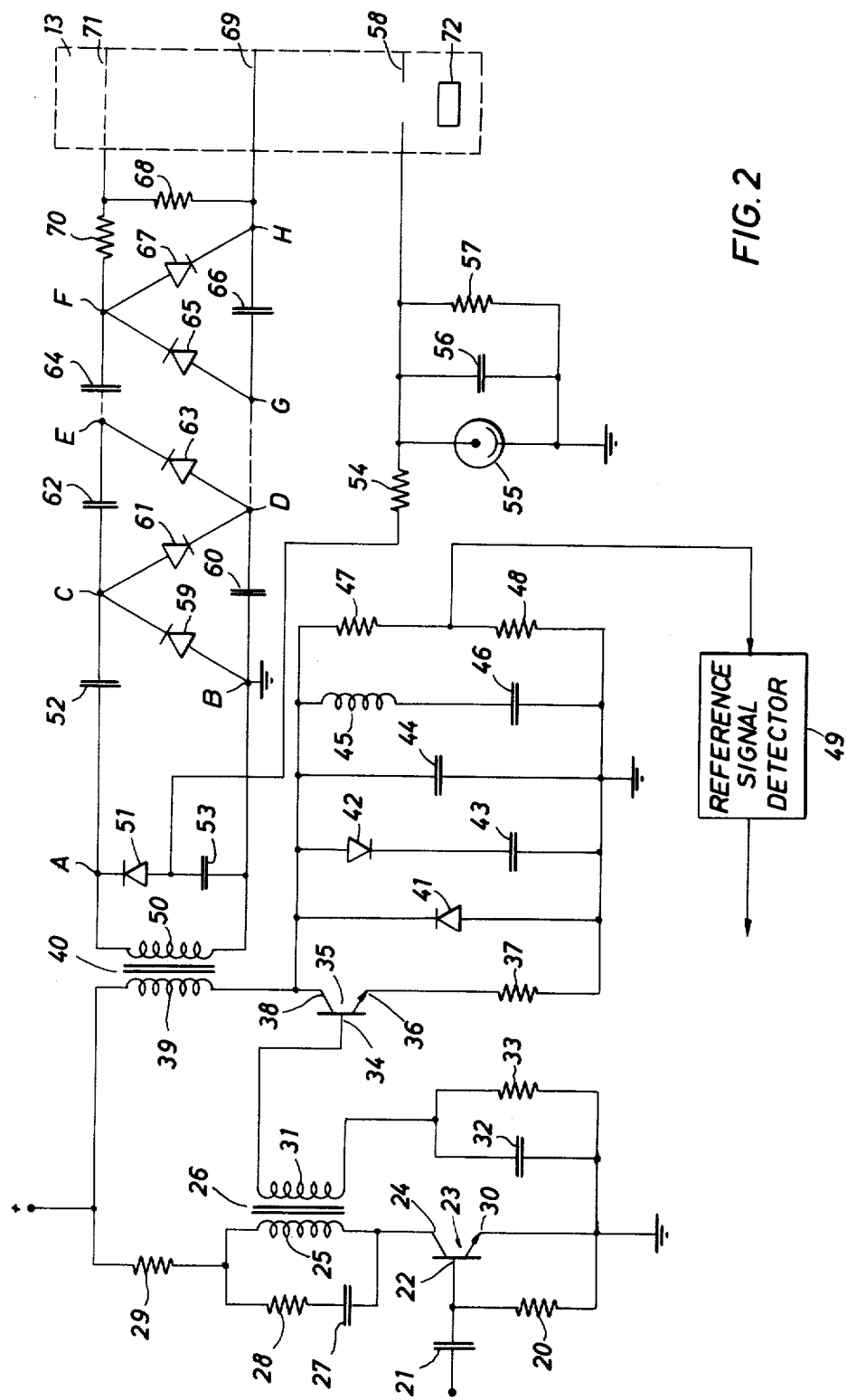
FIG. 2 is a schematic illustration of the circuitry according to the present invention.

Referring now to FIG. 2, there is illustrated schematically the circuitry of the high voltage pulsed supply used to operate pulsed neutron source 13. An input clock signal is coupled, through capacitor 21, to base 22 of transistor 23. Base 22 is further connected to ground by resistor 20. Collector 24 of transistor 23 connects to primary 25 of transformer 26. In parallel with primary 25 is capacitor 27 and resistor 28. The junction of primary 25 and resistor 28 is connected to a positive voltage source by resistor 29. Emitter 30 of transistor 23 is connected to ground.

Secondary 31 of transformer 26 is connected at the lower end to the junction of capacitor 32 and resistor 33 the opposite end of each being connected to ground. The upper end of the secondary 31 of transformer 26 is connected to base 34 of transistor 35 the emitter 36 of which is connected to ground by way of resistor 37. Collector 38 of transistor 35 connects to primary 39 of transformer 40 the other end of which connects to the positive voltage source. Collector 38 of transistor 35 also connects the diode 41; diode 42 which connects to capacitor 43; capacitor 44; inductor 45 which connects to capacitor 46; and resistor 47 which connects to resistor 48. Further, diode 41, capacitor 43, capacitor 44, capacitor 46 and resistor 48 are connected to ground. The junction of resistor 47 and resistor 48 is also connected to reference signal detector 49.

Secondary 50 of transformer 40 connects to the cathode of diode 51 and to capacitor 52 at junction A. The anode of diode 51 connects to capacitor 53 which connects to ground. The junction of diode 51 and capacitor 53 is connected to resistor 54 whose opposite end connects to voltage regulator 55, capacitor 56 and resistor 57, all of which are connected at the opposite end to ground. The junction of resistor 54 voltage regulator 55,, capacitor 56 and resistor 57 connects to grid 58 of neutron source 13.

As previously stated, secondary 50 is connected to capacitor 52 at junction A, junction A being connected to junction C by means of capacitor 52. The lower segment of secondary 50 of transformer 40 is connected to junction B which is grounded. The anode of diode 59 is connected to junction B and the cathode of diode 59 is connected to junction C. Junctions B and D are connected together by means of capacitor 60. The anode of diode 61 is connected to junction C where as the cathode of diode 61 is connected to junction D. Junctions C and E are connected together by means of capacitor 62. The anode of diode 63 is connected to junction D whereas the cathode of diode 63 is connected to junction E. The same type connection of diodes and capacitors is carried out until a desired number of stages are connected together.

The final stage of the voltage multiplier is illustrated by capacitor 64 being connected to junction F. The anode of diode 65 is connected to junction G whereas the cathode of diode 65 is connected to junction F. Junction G is connected to junction H by means of capacitor 66. The cathode of diode 67 is connected to junction H which connects to resistor 68 and anode 69 of ion source 13. Junction F is connected through resistor 70 to cathode 71 of ion source 13. Also connected to cathode 71 is resistor 68. Further, within ion source 13 is target 72. It should be appreciated that such ion sources are well known in the art for use with accelerator tubes and are useful in producing high energy neutrons, especially from the D-T reaction, which are especially useful in radioactivity well logging.

In the operation of the circuitry of FIG. 2, a square wave clock signal is capacitively coupled to base 22 of transistor 23. The shaped output of transistor 23 is transformer coupled by means of impedance matching transformer 26 to base 34 of driver transistor 35. The secondary 31 of transformer 26 also connects to resistor 33-capacitor 32 network which slightly differentiates the base signal to assist in turning off transistor 35.

When the signal is applied to base 34 of transistor 35 current will flow through primary 39 of transformer 40, transistor 35 and associated circuitry. The voltage induced in primary 39 of transformer 40 can be described by the equation:

$$V = L\Delta i / \Delta t$$

where L is the inductance, $\Delta i$ is the change in current flowing through the primary and $\Delta t$ is the change in time corresponding to the current flow. A more complete understanding of this section of the circuitry of FIG. 2 can be had by reference to the signal waveforms of FIG. 3. As shown by waveform 3A, base 34 of transistor 35 will be caused to go positive due to the signal supplied by transformer 26. This positive increase causes transistor 35 to conduct thereby causing an increase in current through primary 39 of transformer 40. The rise in current through primary 39 will occur over a relatively long time period and thus there will be induced in primary 39 a small negative going potential. During flyback, the period when transistor 35 is caused not to conduct, there will be a very fast drop in current flowing through primary 39, and as shown by the above equation, a positive voltage of much higher amplitude will be induced. Waveform 3B is representative of the signal present on primary 39. The induced voltage signal in primary 39 is coupled to secondary 50, as shown in waveform 3C. The signal on secondary 50 is approximately twenty times that of the signal on primary 39 due to the turns ratio between primary 39 and secondary 50, or ranging between $-3$ Kv and $+14$ Kv.

Again referring to FIG. 2, collector 38 of transistor 35 is connected to several diodes, capacitors and the like. Diode 41, diode 42 and capacitor 43 function to prevent damage to transistor 35 should transformer 40 arc or should collector 38 attempt to go negative. Resistor 47 and resistor 48 serve as a voltage divider, setting the level of the reference signal which is coupled to reference signal detector 49. Reference signal detector 49 is comprised of a well known threshold detection circuit and provides a tracking pulse to be used in gating of the detector circuitry to assure that the detector will be gated on at the proper time regardless of changes in the flyback time or firing point of the ion source due to temperature affects or changes in component values. Also, connected to collector 38 is a network comprising capacitor 44, capacitor 46 and inductor 45. These components serve as a tuned network which aid in setting the fall time of the signal. The values of these components are selected to tune the shape of the voltage pulse induced in primary 39 and can be selected to allow source operation over a wide range of frequencies or a wide range of widths of the neutron burst. By establishing a pulse of short duration in primary 39 there is achieved a very fine control of the firing time of the ion source which is required at high operating frequencies.

As previously stated, the waveform 3C present at secondary 50 ranges from approximately $-3$ Kv to $+14$ Kv. The negative portion of the signal is rectified by diode 51. The voltage is regulated by regulator 55 to provide a $-2200$ volt potential to grid 58 of ion source 13. The negative d.c. voltage on grid 58 serves to suppress secondary electrons from returning to anode 69 during operation of ion source 13.

Secondary 50 is further connected across a voltage multiplier circuit of a type described in U.S. Pat. No. 3,924,138, issued to E. C. Hopkinson and assigned to the assignee of the present application. It should be appreciated that the voltage, E, appearing from junction C to B is approximately equal in amplitude to the voltage appearing between points A and B on secondary 50. The voltage appearing between junctions D and B is equal to 2E. The voltage appearing between E and B is equal to 3E. Further out in the multiplier circuitry, the voltage appearing between F and B is equal to $(2N-1)E$ and the voltage from H to B is equal to 2NE, where E is the peak value of the input voltage, N is the number of stages and where two capacitors and two diodes comprise one stage.

If the multiplier is supplying current to a load, then the input voltage will be:

$$V = 2NE - I/fc\left(\frac{2N^3}{3} + \frac{N^2}{2} - \frac{N}{6}\right)$$

$$= 2NE - \Delta V$$

where f is the frequency of the input voltage, I is the load current and C is the capacitance of one of the capacitors.

As the load current increases, the ripple voltage at the output will increase and will be determined by the expressions:

$$\delta V = \frac{I}{fc} N \frac{(N+1)}{2}$$

so that the total voltage varies between the values
Vmax = 2NE − ΔV and
Vmin = 2NE − ΔV − δV.

Referring further to FIG. 2, the highest potential of the voltage multiplier, appearing at junction H, is connected to anode 69 of the accelerator tube, the cathode 71 of the ion source being connected one-half stage further down through resistor 70 to junction F. By having enough stages, there is sufficient voltage developed across diode 67 and of the correct polarity to ignite ion source 13 and produce positive ions within the accelerator tube. The remaining voltage between the ion source cathode 71 and ground is the acceleration voltage.

With no load on the circuit, a nearly constant d.c. voltage appears between junctions F and H. As the multiplier begins to supply current to the accelerator tube, the ripple will begin to increase and will appear, along with the d.c. component, at the ion source anode 69 and cathode 71. If resistor 70 is inserted between junction F and ion source cathode 71, the resistance in combination with the cathode capacitance to ground tends to filter the ripple portion of pulses at the ion source cathode 71, leaving the excess of ripple at anode 69. By selection of resistor 70 a condition is attained whereby the ion source dumps its charge during the pulse and extinguishes itself after the pulse has passed, thereby producing a burst of neutrons at a rate determined by the driving pulse.

Thus, there has been described and illustrated herein apparatus in accordance with the present invention wherein a new and improved pulsed power supply is described. However, while particular embodiments of the present invention have been illustrated and described, it will be apparent to those skilled in the art that changes and modifications may be made without departing from the invention in its broader aspects.

The embodiments of the invention in which an exclusive property or privilege is claimed are defined as follows:

1. A circuit for pulsing a high voltage ion source in an accelerator tube having an anode, a cathode and a grid, comprising:
    a step-up transformer having a primary winding and a secondary winding;

a low voltage, square wave clock signal source;

first transistor means for shaping said low voltage clock signal;

second transistor means responsive to said shaped low voltage clock signal for inducing voltages within said primary winding of said transformer;

a voltage multiplier circuit coupled to said secondary winding of said transformer for supplying first and second voltage potential to said anode and said cathode of said accelerator tube; and a voltage regulator circuit coupled to said secondary winding of said transformer for producing a third voltage potential, said third voltage potential being coupled to said grid of said accelerator tube.

2. The circuit accordance with claim 1, further comprising:

a voltage divider circuit connected across said second transistor means; and a reference signal circuit connected to said voltage divider circuit for producing an electrical signal functionally related to said pulsing of said ion source.

3. A circuit for high frequency pulsing of an ion source in an accelerator tube having an anode electrode, a cathode electrode, and a grid electrode, comprising:

a voltage multiplier circuit connected between said anode electrode and said cathode electrode of said accelerator tube;

a fly-back transformer having a primary winding and a secondary winding, said secondary winding being coupled to said voltage multiplier circuit;

a transistor having a base, a collector connected to said primary winding of said transformer and an emitter circuit connected to ground;

low voltage gating means coupled to said base of said transistor for causing a voltage pulse to be induced in said primary winding;

a regulator circuit for supplying a portion of said induced voltage to said grid and said accelerator tube; and circuit means for establishing the shape of said induced voltage pulse for controlling said pulsing of said ion source.

4. The circuit in accordance to claim 3 further comprising a voltage divider circuit connected across said transistor for establishing a reference signal indicative of the pulsing of said ion source.

* * * * *